L. S. BORTREE.
Horse Rake.
No. 84,254.
Patented Nov. 24, 1868.
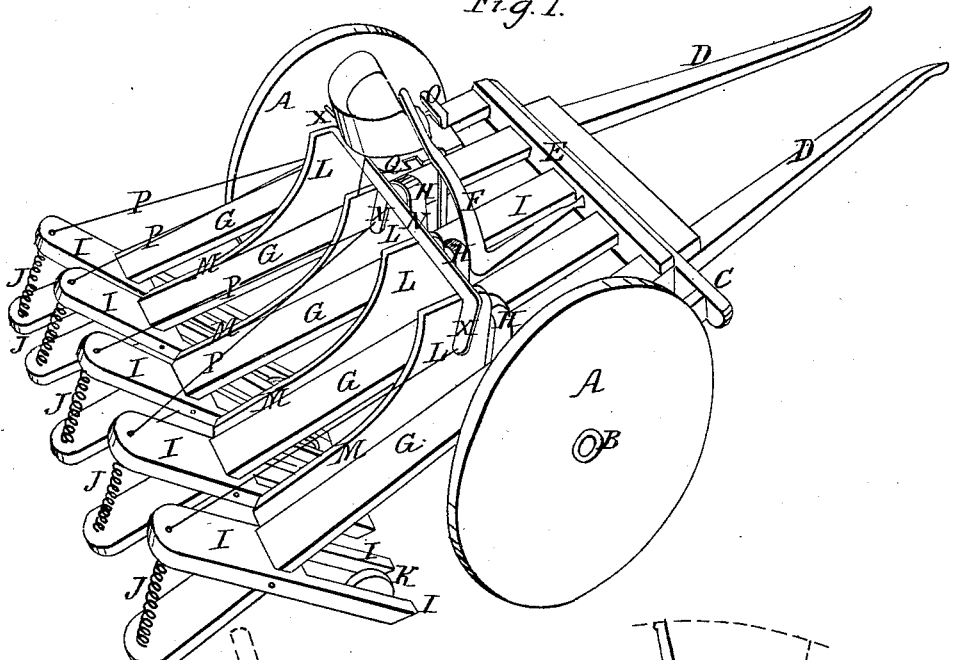
Fig. 1.
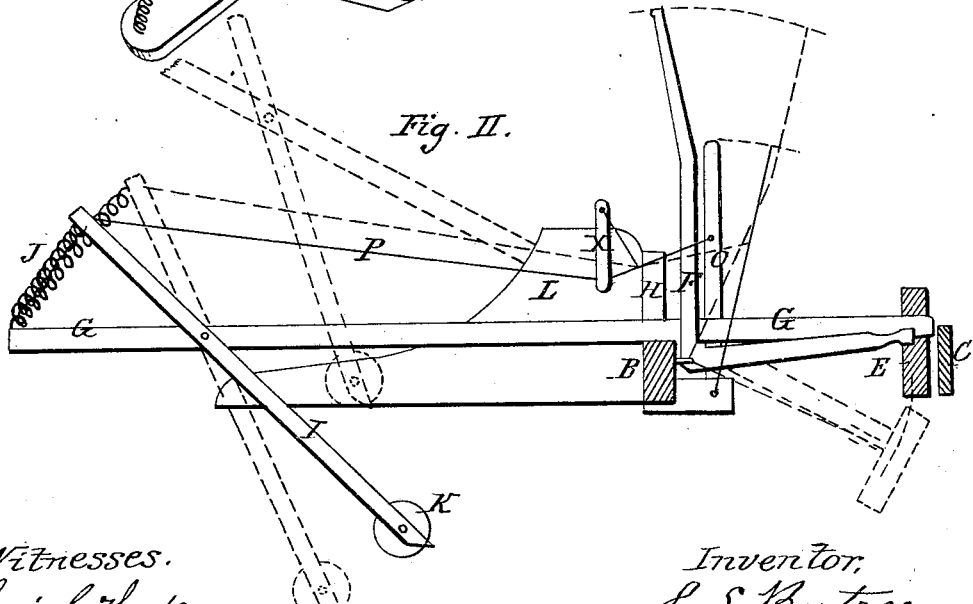
Fig. II.
Witnesses.
Louis C. Hyde,
B. J. Sprague
Inventor,
L. S. Bortree.

LEWIS S. BORTREE, OF GRAND RAPIDS, MICHIGAN.

Letters Patent No. 84,254, dated November 24, 1868.

IMPROVEMENT IN HORSE-RAKES.

The Schedule referred to in these Letters Patent and making part of the same.

*To whom it may concern:*

Be it known that I, LEWIS S. BORTREE, of Grand Rapids, in the county of Kent, and State of Michigan, have invented a new and useful Improvement in Self-Adjusting Horse-Rakes; and I do declare that the following is a true and accurate description thereof, reference being had to the accompanying drawings, and to the letters of reference marked thereon, and being a part of this specification, in which—

Figure 1 is a perspective view of my invention, and

Figure 2 is a longitudinal section, partially in outline.

Similar letters indicate the same parts in each figure.

The object of this invention is to construct a horse-rake principally of wood, the teeth of which will adjust themselves to the inequalities of the ground, and so hinged to a tilting-frame that they will pass over roots, stones, and other obstructions, without being broken or damaged.

The construction of this rake is such that the points of the teeth do not come into contact with the ground, to scratch the surface and raise a cloud of dust, which is deposited on the hay, and is a prominent cause of the disease in horses known as "heaves." The rake is simple and cheap of construction, and easy to operate.

To enable others skilled in the art to make and use my invention, I will now proceed to describe the same, and name its various parts.

A are traction-wheels, revolving on a proper axle, B, to the front of which is rigidly secured the frame C, carrying the shafts D.

Within this frame C is a vibrating frame, E, the rear end of which is hinged to the front of the axle B.

F is a bell-crank lever, hinged in the angle to the axle, and serves to raise and depress the vibrating-frame E, as may be desired.

Hinged to the front of the vibrating frame E are arms G, running back over the axle B, between the guides H, placed thereon.

Near the rear end of these arms G are pivoted the slotted double-pronged rake-teeth I, which are kept at the proper angle to pass under and take up the hay, by the spiral springs J between the heads of the teeth and the rear ends of the arms G.

K are rollers, hung between the prongs of the teeth I, in such a manner that the points of the teeth will always be near the ground, without touching it.

L are standards, secured to the top of the axle, which are elongated to form the cleaners M.

N is a rock-shaft, journalled into the top of the standards L, and provided with the arms X, one of which is connected to the foot-lever O, placed in front of the driver's seat.

P are wires, connecting the levers X with the heads of the teeth I, so that, when the foot-lever O is thrown forward, the teeth will be caused to assume a nearly-vertical position, facilitating the dumping of the windrow in the rake.

Q is a quadrant, conveniently placed by the side of the driver's seat, and provided with notches to receive and hold the bell-crank lever F and foot-lever O in any desired position.

Having thus described my invention, I will now explain the method of operating the same.

The teeth being depressed, by throwing the lever of the bell-crank F into the back notch of the quadrant Q, the rake is drawn forward by the horse, until a sufficient quantity of hay is taken up by the rake. The driver, with his foot, then throws forward the foot-lever O, which causes the rake-teeth I to assume a nearly vertical position. At the same time he disengages the lever F from its notch in the quadrant, throws it forward, when the rear end of the rake is tilted up, and the windrow dumped, the nearly-vertical position of the teeth facilitating the discharge of the windrow. The levers are then allowed to drop back to their proper positions.

Should a stone or other obstruction be met with, the tooth will rise up and slide over it, the arms G being hinged at their front ends for this purpose.

If the point of a tooth catch under a root, as the machine advances, the tooth will strain its spring J, until the tooth assumes a vertical position, when its arm G will rise and release it. It then returns to its former position.

What I claim as my invention, and desire to secure by Letters Patent, is—

1. The vibrating frame E, bell-crank lever F, arms G, slotted double-pronged teeth I, provided with rollers K, and the spiral springs J, when constructed, arranged, and operating substantially as herein described, and for the purposes specified.

2. The standards L, rock-shaft N, provided with arms X, the wires P, foot-lever O, and bell-crank lever F, substantially as and for the purposes set forth.

LEWIS S. BORTREE.

Witnesses:
H. F. EBERTS,
LOUIS C. HYDE.